United States Patent
Gardiner et al.

(10) Patent No.: US 10,749,990 B1
(45) Date of Patent: *Aug. 18, 2020

(54) AUTOMATIC DISCOVERY OF API INFORMATION

(71) Applicant: Google LLC, Mountain View, CA (US)

(72) Inventors: A. Marsh Gardiner, Mountain View, CA (US); Yegor Pomortsev, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,906

(22) Filed: Jan. 28, 2019

Related U.S. Application Data

(63) Continuation of application No. 14/723,240, filed on May 27, 2015, now Pat. No. 10,194,001.

(51) Int. Cl.
*H04L 29/06* (2006.01)
*H04L 29/08* (2006.01)

(52) U.S. Cl.
CPC .............. *H04L 67/42* (2013.01); *H04L 67/10* (2013.01)

(58) Field of Classification Search
CPC .. G06F 17/30; G06F 17/30106; G06F 21/629; G06F 17/30598; H04L 67/16; H04L 63/102
See application file for complete search history.

(56) References Cited

U.S. PATENT DOCUMENTS

| | | | | |
|---|---|---|---|---|
| 8,341,099 B2* | 12/2012 | Khosravy | .............. | G06Q 10/10 706/12 |
| 2014/0150095 A1* | 5/2014 | Zhao | ....................... | H04L 29/06 726/22 |
| 2015/0128156 A1* | 5/2015 | Zhu | ..................... | G06F 11/3072 719/328 |
| 2015/0169385 A1* | 6/2015 | Allen | ..................... | G06F 9/541 719/328 |
| 2016/0080493 A1* | 3/2016 | Roth | ................... | G06F 9/45529 709/203 |
| 2016/0255137 A1 | 9/2016 | Bleau | | |
| 2016/0267153 A1* | 9/2016 | Witkop | .................. | G06Q 10/00 |
| 2016/0285861 A1* | 9/2016 | Chester | .................... | H04L 9/14 |
| 2016/0337333 A1* | 11/2016 | Rollet | ..................... | H04L 63/08 |
| 2017/0148264 A1* | 5/2017 | Pichette | ................. | G06Q 30/06 |

* cited by examiner

*Primary Examiner* — Ario Etienne
*Assistant Examiner* — Kidest Mendaye
(74) *Attorney, Agent, or Firm* — Lerner, David, Littenberg, Krumholz & Mentlik, LLP

(57) ABSTRACT

Automatic discovery of API information is disclosed, including: receiving a transaction; obtaining a determined signature from the transaction; and determining that the determined signature comprises a candidate signature to potentially add to an application programming interface (API) model.

20 Claims, 5 Drawing Sheets

AUTOMATIC DISCOVERY OF API INFORMATION

CROSS-REFERENCE TO RELATED APPLICATION

This application is a continuation of U.S. application Ser. No. 14/723,240, filed May 27, 2015, the contents of which are incorporated by reference herein.

BACKGROUND OF THE INVENTION

A server may provide various services that can be consumed via application programming interface (API) calls from clients. However, the full set of services that is provided by the server may not be completely documented. The incompleteness of API call documentation may be due to insufficient information supplied by a server administrator user or due a lack of updating since the addition of new services to the server, for example.

BRIEF DESCRIPTION OF THE DRAWINGS

Various embodiments of the invention are disclosed in the following detailed description and the accompanying drawings.

DETAILED DESCRIPTION

Figure 1:
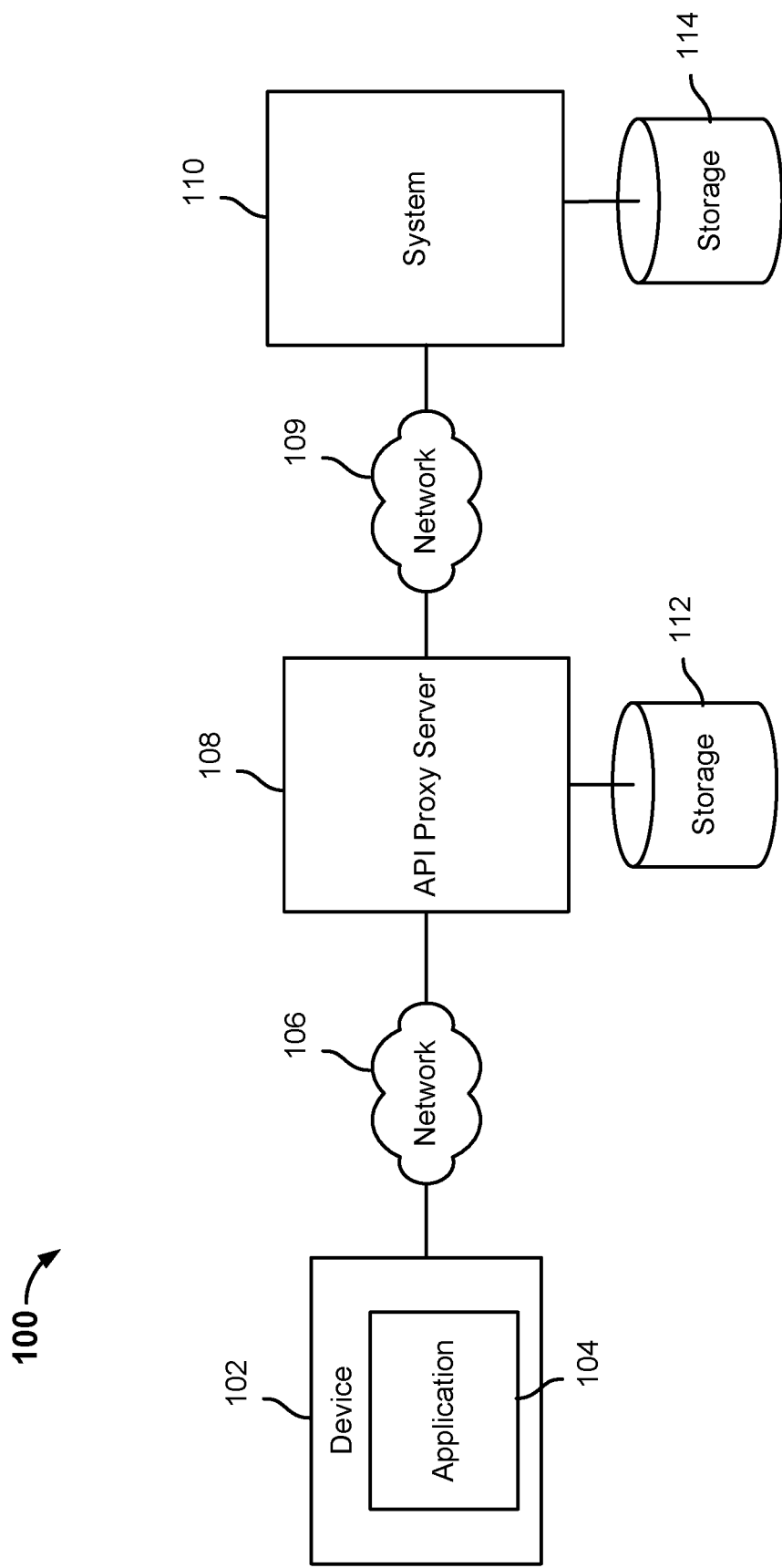
FIG. 1 is a diagram showing an embodiment of a system for automatic discovery of API information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of automatic discovery of API information are described herein. A transaction is received. In some embodiments, the transaction comprises a request that is received at an external interface of an application programming interface (API) proxy server. The external interface of the API proxy server is configured to exchange information with a client. In some embodiments, the request comprises an API request. In some embodiments, the transaction comprises a response, which is received at an internal interface of the API proxy server, to the request. The internal interface of the API proxy server is configured to exchange information with a system. In some embodiments, the system comprises a "backend" system. A signature is determined from the transaction. In various embodiments, a "signature" comprises a set of attributes that uniquely identifies either a request or a response to the request. For example, a request signature may include a resource path pattern, HTTP verb, header, body element, or a combination of one or more of those. The determined signature is potentially added to an API model. In various embodiments, an "API model" comprises a description of an API's protocol, including its functions (methods), data formats, authentication schemes, and any other metadata, such as human-readable documentation or sample requests and responses. For web APIs that follow the resource/method abstraction, for example, the API model may describe each resource and related methods. The API model itself can be described using an API modeling language/format, such as Web Application Description Language (WADL), Web Services Description Language (WSDL), or Swagger 2.0, for example. In some embodiments, an "API model" describes information exchanges between the client and the external interface. In some embodiments, the "API model" describes information exchanges between the internal interface and the server. In some embodiments, the "API model" describes information exchanges between the client and the external interface and information exchanges between the internal interface and the server.

FIG. 1 is a diagram showing an embodiment of a system for automatic discovery of API information. In the example, system 100 includes device 102, network 106, API proxy server 108, storage 112, network 109, system 110, and storage 114. Each of network 106 and network 109 may comprise high-speed data networks and/or telecommunications networks. In some embodiments, network 106 and network 109 are different networks. In some embodiments, network 106 and network 109 are the same network. Storage 112 is accessible by API proxy server 108. Storage 114 is accessible by system 110.

Application 104 is executing on device 102. In various embodiments, an application executing at a device, such as application 104, is sometimes referred to as a "client." Examples of device 102 may include a desktop computer, a laptop computer, a mobile device, a smart phone, a tablet device, and any other type of computing device.

API proxy server 108 comprises an intermediary node in between clients such as application 104 and systems such as system 110. In various embodiments, if a system sits behind a proxy server, such as system 110, the server is sometimes referred to as a "backend server." Generally, API proxy server 108 acts as an API proxy to systems such as system 110 and is configured to expose a set of services provided by the systems to clients such as application 104. An example of a service that is provided by system 110 is retrieving data associated with application 104. In some embodiments, API proxy server 108 is configured to provide authentication for a user using application 104 on behalf of systems such as system 110. API proxy server 108 serves as a front end for the systems and handles incoming API requests and processes them before sending the requests to the system for further processing.

Application 104 is configured to generate an API request to access a service provided by system 110. For example, application 104 is configured to generate the API request based on a user's interaction (e.g., selection(s), inputs(s)) or in response to an event generated by a process for a service. The API request is sent over network 106 to API proxy server 108. In various embodiments, API proxy server 108 comprises an API management server that receives API requests from applications, over network 106, and forwards the API requests to one or more backend systems, such as system 110, over network 109. In various embodiments, API proxy server 108 acts as an external interface associated with a system such as system 110 and therefore receives an API request that includes an external address associated with the external interface associated with the system. API proxy server 108 is configured to translate the external address into an internal address of the system and forward the API request, over network 109, to the system at the internal address via an internal interface of API proxy server 108. In some embodiments, API proxy server 108 is configured to translate the external address included in an API request into an internal address of the system using a stored mapping between the external address and the internal address of the system that is stored at storage 112. The system processes the API requests sent by API proxy server 108 then sends back the responses to the processed API requests over network 109. These responses are sent to the internal interface of API proxy server 108, which in turn, sends the responses to the requesting application via the external interface over network 106. For example, application 104 may have been developed by a party that is associated with the party that operates system 110.

API proxy server 108 is configured to store one or more API models corresponding to each of one or more systems such as system 110 at storage 112. In various embodiments, an API model corresponding to a system such as system 110 comprises information that describes the known signatures of requests, the known signatures of responses to requests, descriptions, and/or references to data to be retrieved from or saved to storage 114 associated with system 110. In some embodiments, a first API model that is associated with system 110 is related to the external interface of API proxy server 108 and may include a set of any or all characteristics of requests made from application 104 to API proxy server 108 and responses returned from API proxy server 108 to application 104. In some embodiments, a second API model that is associated with system 110 is related to the internal interface of API proxy server 108 and may include a set of any or all characteristics of requests made from API proxy server 108 to system 110 and the responses returned from system 110 to API proxy server 108. In some embodiments, the two API models can be implemented as a single API model associated with system 110.

In some embodiments, an existing API model associated with a system is stored at storage 112. In some embodiments, an existing API model associated with an external interface of API proxy server 108 is generated based at least in part on user input of signatures of API requests and/or response to the API requests. In some embodiments, API proxy server 108 is configured to receive an API request associated with a system from an application such as application 104, determine the signature from the API request, and determine whether the determined signature can be found in a classification map that is derived from the existing API model associated with the external interface of API proxy server 108. In some embodiments, API proxy server 108 is configured to receive a response to the API request from the system, such as system 110, determine the signature from the response to the API request, and determine whether the determined signature can be found in a classification map that is derived from the existing API model associated with the external interface of API proxy server 108. There may several reasons that the signature from the API request or the signature from the response to the API request cannot be found in a classification map that is derived from the existing API model. A first example reason may be that the existing API model was inadvertently left incomplete by an administrative user associated with the system and/or the API proxy server. A second example reason may be that new services were defined at the system for which corresponding signatures have not yet been updated in the API model. In some embodiments, in the event that the determined signature from the API request cannot be found in a classification map that is derived from the existing API model associated with external interface of API proxy server 108, API proxy server 108 forwards the API request to the system and potentially stores the determined signature of the API request based on the response received from the system. Over time, API proxy server 108 is configured to collect various signatures determined from API requests and/or the system's responses to such API requests that cannot be found in the classification map associated with a system. In some embodiments, API proxy server 108 is configured to present at least a portion of such determined signatures at a user interface (e.g., for an administrative user of the system) as candidate signatures to potentially add to the existing API model, if any, of the system. In some embodiments, API proxy server 108 is configured to automatically add at least a portion of such determined signatures to the existing API model, if any, without presenting them at a user interface or in response to any user intervention.

Similarly, in some embodiments, API proxy server 108 is configured to determine a signature from a request that API proxy server 108 generates for a system and/or a signature to a response received from the system to such a request and determine whether the determined signature can be found in a classification map that is derived from the existing API model associated with the internal interface of API proxy server 108. In the event that the determined signature cannot be found in a classification map that is derived from the existing API model associated with the internal interface of API proxy server 108, API proxy server 108 forwards the request to the system and potentially stores the determined signature of the API request based on the response received from the system. Over time, API proxy server 108 is configured to collect various signatures determined from requests and/or the system's responses to such requests that cannot be found in the classification map associated with a system. In some embodiments, API proxy server 108 is configured to present at least a portion of such determined signatures at a user interface (e.g., for an administrative user of the system) as candidate signatures to potentially add to the existing API model, if any, of the system. In some embodiments, API proxy server 108 is configured to automatically add at least a portion of such determined signatures to the existing API model, if any, without presenting them at a user interface and/or any user intervention.

In some embodiments, a determined signature (from a request or a response) is determined by API proxy server 108 to partially match an existing signature of an API model. For example, the determined signature (from a request or a response) can be determined to partially match an existing signature of an API model if the determined signature comprises a superset of the parameters that are included in the existing signature. In such an event, the determined signature comprises a modification to the existing signature and the existing signature in the API model may be modified and/or replaced by the determined signature.

As such, API proxy server 108 is configured to automatically discover API signatures associated with a system through observing the API traffic associated with the system over time. The discovered signatures may comprise new signatures, modifications to existing signatures, and/or signatures that were otherwise not yet documented in an API model associated with the system. The API signatures may be automatically discovered, without user intervention, and used to create a new API model for a system if one did not exist already. Or, if an API model already existed for a system, then the automatically discovered API signatures may be used to update the existing API model associated with the system to help maintain a more complete and up-to-date API model. In some embodiments, the discovered signatures may be automatically added to the API model. In some embodiments, the discovered signatures may be first presented at a user interface and then added to the API model in response to a user input in an assisted model management type of scheme.

In some other embodiments, API proxy server 108 is not used as an intermediary node between application 104 and system 110 and instead, the functions configured to be performed by API proxy server 108 can be implemented as an agent running on system 110. In such embodiments in which the functions configured to be performed by API proxy server 108 are implemented as an agent running on system 110, requests and responses are exchanged directly between application 104 and system 110 as the agent performs the discovery of API information to use to update an API model associated with system 110.

In some other embodiments, API proxy server 108 is not used as an intermediary node between application 104 and system 110 and instead, the functions configured to be performed by API proxy server 108 can be implemented by a separate server that receives copies of requests and responses exchanged between application 104 and system 110. In such embodiments in which the functions configured to be performed by API proxy server 108 are implemented by a separate server, the separate server performs the discovery of API information to use to update an API model associated with system 110.

Figure 2:
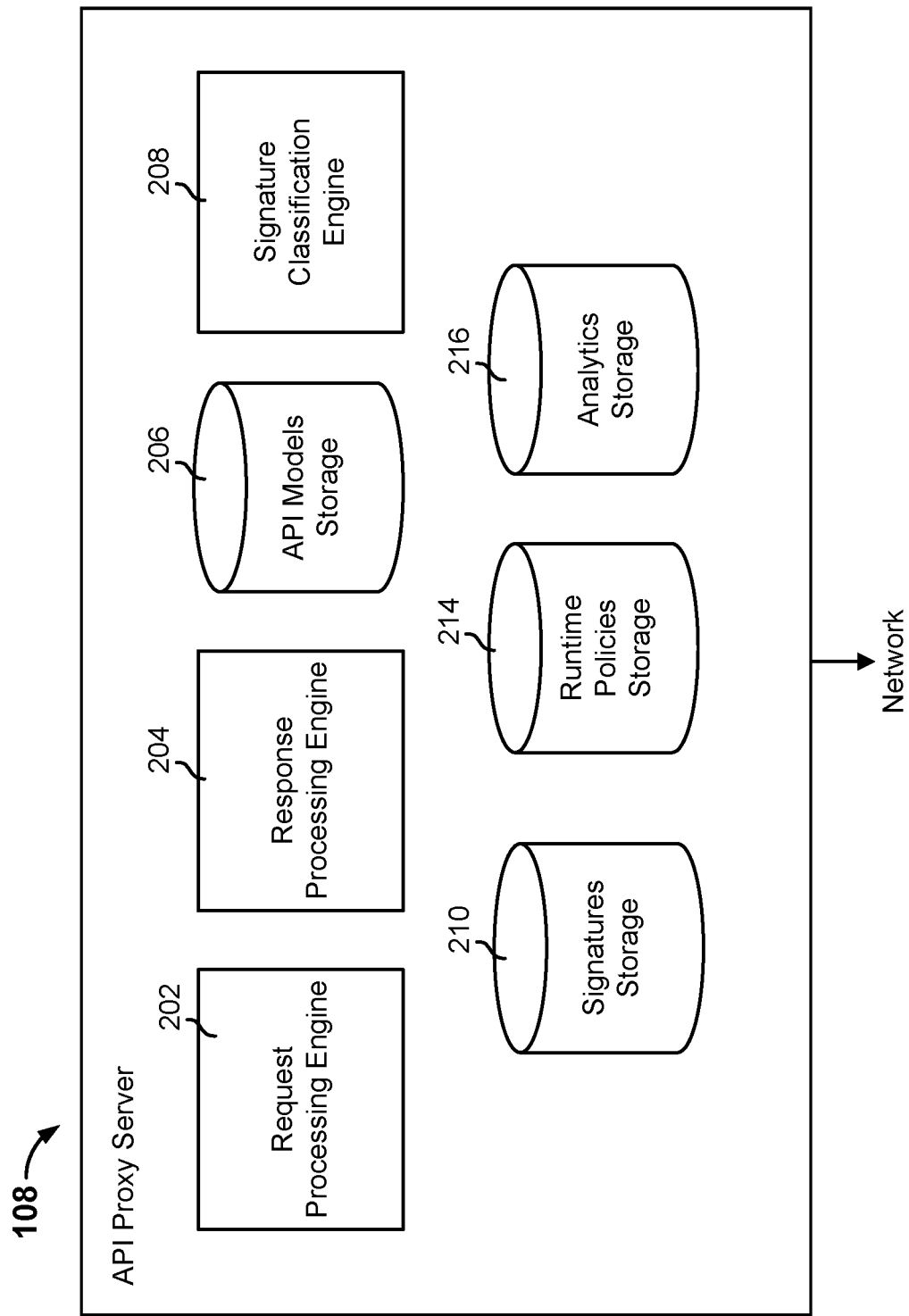
FIG. 2 is a diagram showing an example of an API proxy server.

FIG. 2 is a diagram showing an example of an API proxy server. In some embodiments, API proxy server 108 and storage 112 of system 100 of FIG. 1 can be implemented using the example of FIG. 2. In the example, the API proxy server 108 includes request processing engine 202, response processing engine 204, API models storage 206, signature classification engine 208, signatures storage 210, runtime policies storage 214, and analytics storage 216. Each of request processing engine 202, response processing engine 204, and signature classification engine 208 can be implemented using software, hardware, or a combination of software and hardware.

In some embodiments, request processing engine 202 is configured to receive an API request from a client and translate at least a portion of the API request prior to forwarding the API request to a corresponding system (e.g., backend system). In some embodiments, request processing engine 202 does not need to perform translation on the API request. In some embodiments, request processing engine 202 does not forward the received API request to the system. In various embodiments, the API request comprises a request for a service to be performed by a system or a description of or reference to data to be retrieved from or saved to a storage associated with the system. In various embodiments, the API request includes an external address associated with an external interface provided by the API proxy server. In some embodiments, request processing engine 202 is configured to translate the external address of the API request into an internal address associated with the corresponding system before forwarding the API request to the system. Request processing engine 202 is configured to translate the external address of the API request into an internal address associated with the corresponding system using a stored mapping between the external and internal addresses of the system. In some embodiments, request processing engine 202 is also configured to convert a received API request into a different format and one that will be understood by the system before forwarding the API request to the system. For example, converting the received API request into a format that will be understood by the system can include transforming a request that conforms to the API model associated with the external interface of the API proxy server into a format that conforms to the API model associated with the internal interface of the API proxy server.

Response processing engine 204 is configured to receive a response to an API request from a system (e.g., a backend system) and forward the response to the client from which the API request had originated. In some embodiments, the response to the API request comprises a result to a requested operation such as data that was requested. In some embodiments, the response to the API request also includes a status code that indicates whether the API request is valid or invalid due to various factors such as, for example, whether the request was well-formed. In some embodiments, response processing engine 204 is also configured to convert a received response to an API request into a different format and one that will be understood by the client before forwarding the response back to the client. For example, converting the received response to the API request into a format that will be understood by the client can include transforming a response that conforms to the API model associated with the internal interface of the API proxy server into a format that conforms to the API model associated with the external interface of the API proxy server.

API models storage 206 is configured to store current API models associated with various systems (e.g., backend systems). As mentioned above, an API model associated with a system comprises information that describes the known signatures of requests, the known signatures of responses to requests, descriptions, and/or references to data to be retrieved from or saved to a storage associated with the system. In various embodiments, an existing API model may be configured for a system by an administrative user. In some embodiments, not every system may be associated with an existing API model that is stored at API models storage 206. Put another way, initially, a system may not be associated with an API model at all. However, as will be described below, a new API model can be generated for a system and/or an existing API model stored at API models storage 206 can be updated for a system based on the automatic API signature discovery that is performed by signature classification engine 208.

Signature classification engine 208 is configured to extract a signature from an API request and/or a response to the API request that is received at the API proxy server. In various embodiments, a signature of an API request comprises a set of attributes that uniquely identifies either a request or a response to the request. For example, a signature determined from the API request may include a resource path pattern, HTTP verb, header, body element, or a combination of those. For example, a signature in Swagger 2.0 comprises the combination of a unique path pattern and an operation (which is sometimes referred to as a "verb"). In the specific example of a Swagger-based signature, the path pattern comprises address/path for a template parameter and the template parameter comprises a part of a resource path defined in an API model, typically denoted by the parameter name surrounded by curly braces, that can be substituted by the client with a value subject to restrictions defined in the API model. For example, the template parameter comprises a type of variable associated with the object with which the operation of the signature is associated. The following is an example of a Swagger-based signature that may be determined from an API request:

get(/v1/users/{userId})

In the example signature above, "get()" represents an operation to retrieve data and "/v1/users/{userId }" comprises the path pattern. In particular, "{userId}" comprises the template parameter that represents a type of variable that, in this example, stores a user ID value. An actual signature of this type that is extracted from an API request would have an actual user ID value in place of the "{userId}" template parameter. Other example operations besides "get()" include "post()," which represents the operation to request the system to accept data, and "delete()," which represents the operation to request the system to delete data.

In some embodiments, signature classification engine 208 is configured to determine a type of signature to extract from an API request associated with a system based on information that is received from the system and/or observations made over time with respect to received API requests that are associated with the system. As such, different types of APIs that are utilized by different systems may lead to different types of signatures being extracted from API requests for the different systems.

Signature classification engine 208 is configured to compare a signature that is determined from an API request associated with a system to a classification map that is derived from an existing API model (e.g., stored at API models storage 206), if any, that is associated with the system. In various embodiments, a "classification map" that is derived from an API model comprises a search tree that includes a superset of signatures from the API model. The classification map is used to match incoming attributes against known patterns. The classification map may be optimized for run-time classification. In some embodiments, the classification map could be represented in JSON, for example, and a simple implementation could supply a set of regular expressions. In some embodiments, when an API model is updated, its corresponding classification map is optionally updated based on the updated API model. In the event that the signature can be found in the classification map associated with the system, then the signature may be referred to as an "existing signature." Otherwise, in the event that the signature cannot be found in the classification map associated with the system, then the extracted signature may be referred to as a "candidate signature." In some embodiments, regardless of whether the signature extracted from the API request is an existing signature or a candidate signature, signature classification engine 208 is configured to forward the API request to request processing engine 202 for request processing engine 202 to send the API request to the system for a corresponding response. In some embodiments, signature classification engine 208 is configured to forward a copy of the API request to request processing engine 202 (e.g., in the event that request processing engine 202 is stored on a separate device). In some embodiments, request processing engine 202 can perform analysis on the API request without sending the API request to the system for a corresponding response. For example, in the event that the signature determined from an API request comprises a candidate signature, request processing engine 202 may not send the unknown signature to the system at all.

Signature classification engine 208 is configured to receive a response to an API request from the system. In various embodiments, response processing engine 204 is configured to first receive the response to the API request from the system and then forward the response to signature classification engine 208. In various embodiments, the response to an API request comprises at least a hypertext transfer protocol (HTTP) status code that indicates whether the API request is valid (e.g., a status code that comprises a 2xx value), invalid (e.g., a status code that comprises either a 4xx or 5xx value), or is associated with a redirection (e.g., a status code that comprises a 3xx value). In the event that the API request included an existing signature, signature classification engine 208 is configured to send the response to the requesting client. Otherwise, in the event that the response to the API request included a candidate signature, signature classification engine 208 is configured to send the response to the requesting client and also determine whether to store the candidate signature in signatures storage 210 based on the HTTP status code of the response. In various embodiments, in the event that the response to the API request includes a status code that indicates that the API request is valid, signature classification engine 208 is configured to store the candidate signature in signatures storage 210. In some embodiments, in the event that the response to the API request includes a status code that indicates that the API request is invalid, signature classification engine 208 may or may not store the candidate signature in signatures storage 210 based on a stored user input configuration (e.g., stored at signatures storage 210) and may discard the candidate signature in the event that the candidate signature is determined not to be stored. In some embodiments, whether a candidate signature determined from an API request to which the response includes a status code that indicates a redirection should be stored at signatures storage 210 is determined based at least in part on another user input configuration (e.g., stored at signatures storage 210).

In some embodiments, signature classification engine 208 is further configured to determine a signature from a response from a system to an API request. In some embodiments, a signature determined from a response to an API request may describe the format of the data returned (e.g., the format of the data returned may include human-readable text, audio, an image, etc.). In some embodiments, the format of the data returned is determined by signature classification engine 208 reading the Content-Type HTTP header in the response. In a specific example in which a graph API is used by the system, any entity in the system is allowed to be accessed directly by its UID (Unique IDentifier). In this case, signature classification engine 208 would not know the type of the entity until the response declared it. Signature classification engine 208 is configured to compare the signature that is determined from a response to an API request that is received from a system to a classification map that is derived from an existing API model (e.g., stored at API models storage 206), if any, that is associated with the system. In the event that the signature determined from a response to an API request can be found in the classification map associated with the system, then the determined signature may be referred to as an "existing signature" and ignored. Otherwise, in the event that the signature determined from the response to an API request cannot be found in the classification map associated with the system, then the determined signature may be referred to as a "candidate signature" and stored at signatures storage 210.

Signature classification engine 208 is configured to periodically analyze the candidate signatures extracted from API requests and group together similar API request signatures. Similarly, signature classification engine 208 is configured to periodically analyze the candidate signatures extracted from responses to API requests and group together similar API response signatures. In some embodiments, signature classification engine 208 is configured to present groups of similar API signatures at a user interface (e.g., a model management interface). In the event that a user submits an input at the user interface to add a candidate signature to build a new API model of a system (if an API model did not exist before) or to add a candidate signature to update an existing API model of a system, then signature classification engine 208 is configured to add the candidate signature to the corresponding API model stored at API models storage 206. In some embodiments, signature classification engine 208 is configured to sort the candidate signatures into groups based on an administrative user using a model management interface. For example, such a user input may indicate that two signatures that are currently grouped together should not be grouped together or that two signatures that are currently not grouped together should be grouped together and such feedback could impact the manner in which signature classification engine 208 groups the candidate signatures. In some embodiments, signature classification engine 208 is configured to automatically update an existing API model and/or create a new API model, if one did not exist before, without presenting candidate signatures at a model management interface and/or receiving a user input to perform the update/creation.

In some embodiments, request processing engine 202 is configured to apply a runtime policy that is stored at runtime policies storage 214 to a received API request prior to sending it to the system. An example runtime policy to apply to an API request before it is forwarded to the system is to check whether the requestor associated with the API request has already been authenticated. If the requestor has not yet been authenticated, then the API request may be prevented from being sent to the system. But if the requestor has already been authenticated, then the API request may be forwarded to the system. Other examples of runtime policies to apply to the API request before it is forwarded to the system include determining the size of the API request in bytes, determining the values of template parameters, and determining the count of API requests by their respective API signatures.

In some embodiments, request processing engine 202 is configured to apply a runtime policy that is stored at runtime policies storage 214 to a response to an API request prior to sending the response to signature classification engine 208. Example runtime policies to apply to a response to an API request comprises extracting an entity type from the response, determining the size of the response in bytes, determining the counts of responses received with a particular status code, and determining the processing time (latency) between sending the request to system and receiving a response to that request. Another example runtime policy to apply to a response to an API request is to determine if the response includes a status code that indicates that the API request is valid and if so, to store the response to the API request at a cache storage.

Figure 3:
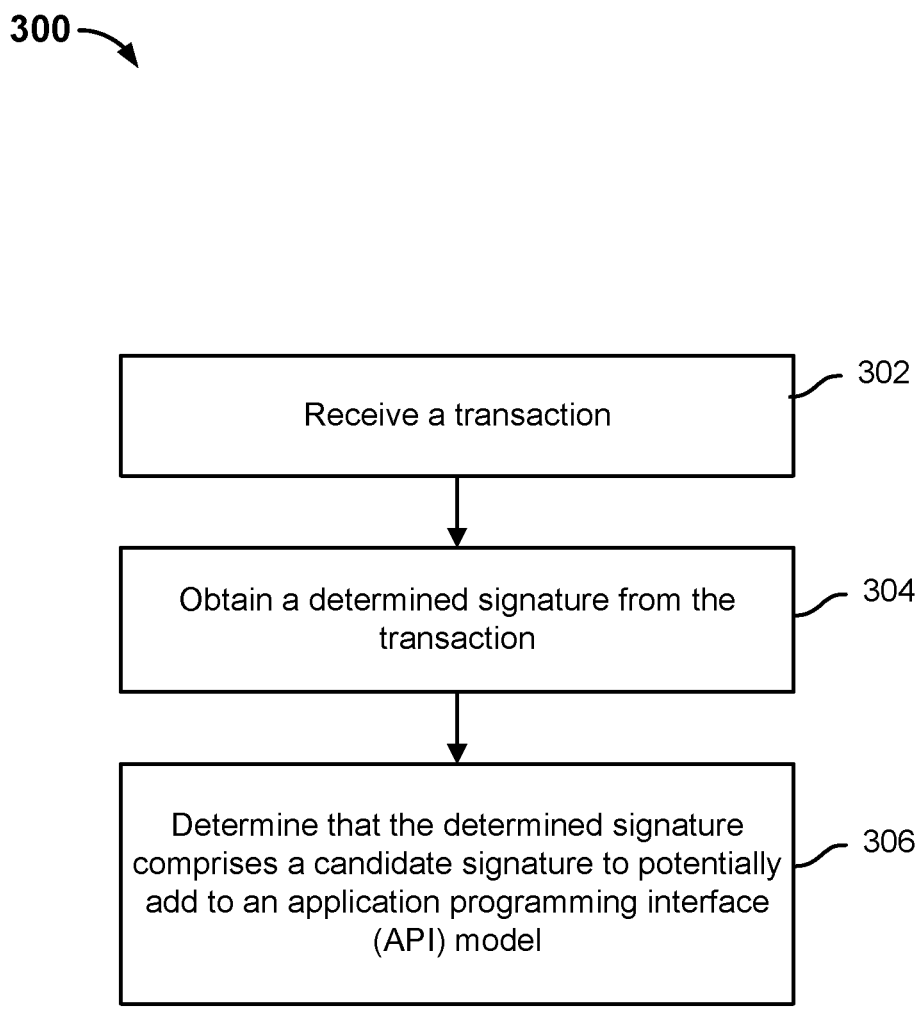
FIG. 3 is a flow diagram showing an embodiment of a process for automatic discovery of API information.

FIG. 3 is a flow diagram showing an embodiment of a process for automatic discovery of API information. In some embodiments, process 300 is implemented at an API proxy server such as API proxy server 108 of system 100 of FIG. 1.

At 302, a transaction is received.

In some embodiments, the transaction comprises a request (e.g., an API request) that is received from a client. In some embodiments, the request is received at an external interface of an API proxy server because the request includes an external address associated with the external interface. In some embodiments, the external interface of the API proxy server is configured to exchange information with a client on behalf of a system (e.g., a backend system) for which the API proxy server acts as a proxy. In some embodiments, the request received at the external interface is translated to include an internal address associated with the system and then passed to the system using the internal address.

In some embodiments, the transaction comprises a response to a request (e.g., an API request) that is received from a system (e.g., a backend system) that had processed the request. In some embodiments, the response is received at an internal interface of an API proxy server from the system. In some embodiments, the internal interface of the API proxy server is configured to exchange information with the system for which the API proxy server acts as a proxy.

At 304, a determined signature is obtained from the transaction.

A signature that is included in the transaction is obtained. In some embodiments, a signature is extracted from the transaction. In some embodiments, a signature from the transaction is identified based at least in part on a type associated with the API associated with the transaction, information provided by the system, and/or observation of historical API traffic received at the external interface over time. In some embodiments, a signature extracted from the transaction includes a set of attributes that uniquely identifies either a request or a response to the request. In some embodiments, a signature determined from an API request may include a resource path pattern, HTTP verb, header, body element, or a combination of those. In some embodiments, a signature determined from a response to an API request may describe the format of the data returned.

At 306, it is determined that the determined signature comprises a candidate signature to potentially add to an API model. In the event that the determined signature is determined to be previously undocumented in an API model associated with the system, then the determined signature is a candidate signature that is to be potentially added to the API model. In some embodiments, the API model is associated with the external interface of the API proxy server and describes the characteristics of requests made from clients to the API proxy server and the responses returned from the API proxy server to the clients. In some embodiments, the API model is associated with the internal interface of the API proxy server and describes the characteristics of requests made from API proxy server to the system and the responses returned from the system to the API proxy server. In some embodiments, the API model describes the characteristics of requests made from clients to the API proxy server, the responses returned from the API proxy server to the clients, the requests made from API proxy server to the system, and the responses returned from the system to the API proxy server. The determined signature is determined to be a candidate signature to potentially add to an API model in the event that no API model exists, if the determined signature does not match an existing signature in a classification map derived from an existing API model, or if the determined signature is determined to be a modification to an existing signature in the classification map derived from the existing API model. In some embodiments, where the transaction comprises a request, a signature determined from the request is not necessarily added to the API model unless the response received from the system to the request indicates that the request is valid. In some embodiments, in the event that the determined signature is determined to be a candidate signature, the candidate signature is automatically added to an existing API model and/or used to create a new API model, without user intervention. In some embodiments, in the event that the determined signature is determined to be a candidate signature, the candidate signature is first presented at a user interface (e.g., a model management interface) and only added to an existing API model and/or used to create a new API model in response to a user input to do so.

Figure 4:
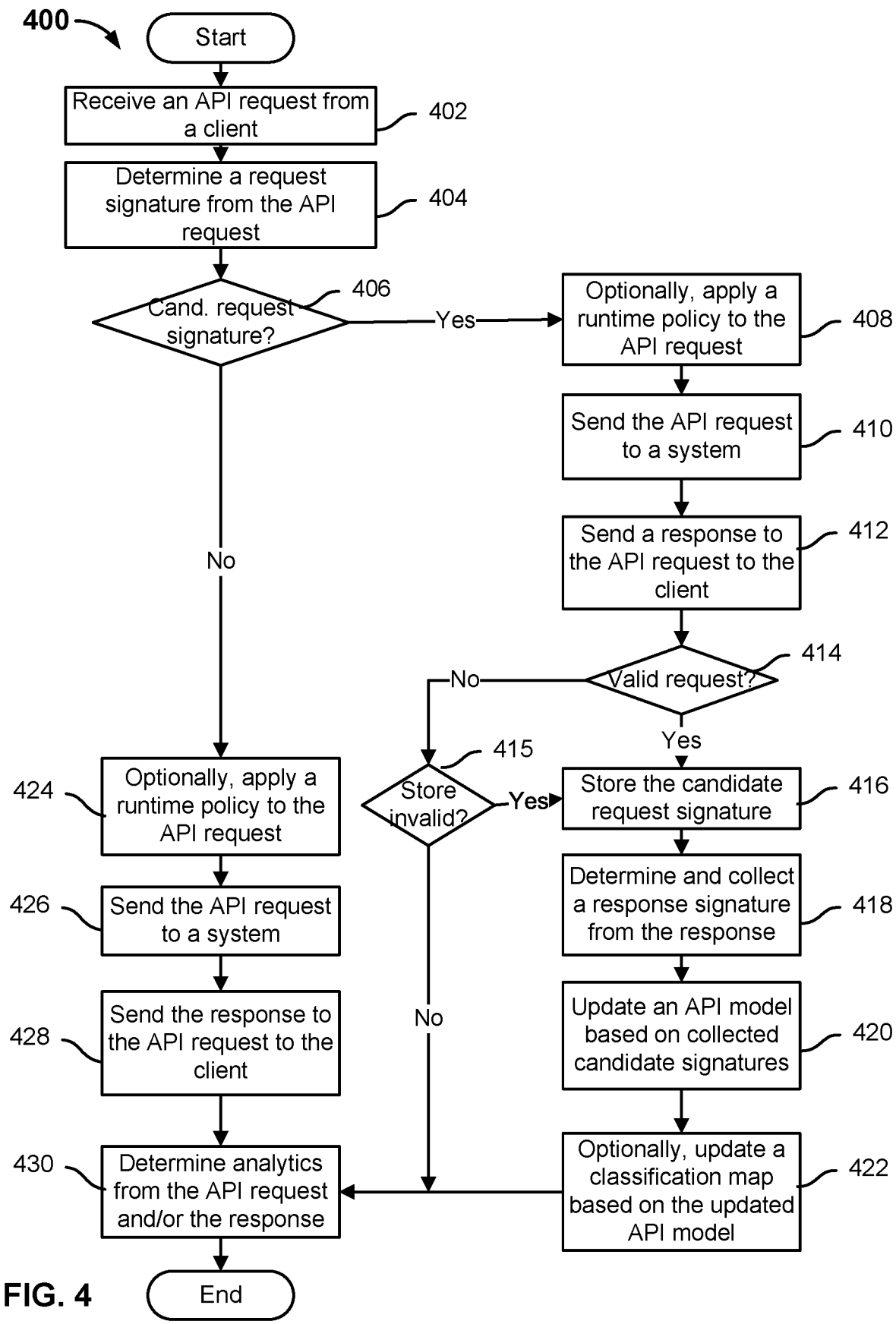
FIG. 4 is a flow diagram showing an example of a process for automatic discovery of API information.

FIG. 4 is a flow diagram showing an example of a process for automatic discovery of API information. In some embodiments, process 400 is implemented at an API proxy server such as API proxy server 108 of system 100 of FIG. 1. In some embodiments, process 300 of FIG. 3 is implemented, at least in part, using process 400.

Process 400 describes an example process of automatic API signature discovery that is performed based on a response from a system to an API request that is associated with that system. Process 400 can be performed for each API request that is received from a client.

At 402, an API request is received from a client. The API request is associated with a particular system (e.g., backend system). In some embodiments, the API request includes an external address associated with an external interface of an API proxy server that serves as the proxy to the system.

At 404, a request signature is determined from the API request. In some embodiments, a signature is determined from the API request based on extraction.

At 406, it is determined whether the determined request signature is a candidate request signature. In various embodiments, in the event that the system with which the API request is associated with is already associated with an existing API model, then the determined request signature is compared against a classification map that is derived from that existing API model. If the determined request signature can be matched to an existing signature in the classification map, then the determined request signature is referred to as an existing request signature. But if the determined request signature cannot be matched to an existing signature in the classification map or is determined to be a modification to an existing signature in the classification map, then the determined request signature is referred to as a candidate request signature. In various embodiments, in the event that the system with which the API request is associated with is not yet associated with an existing API model, then the determined request signature is referred to as a candidate request signature. In the event that the determined request signature is a candidate request signature, control is transferred to 408. Otherwise, in the event that the determined request signature is not a candidate request signature, control is transferred to 424.

At 408, a runtime policy is optionally applied to the API request. Optionally, a runtime policy that is applicable to API requests with candidate request signatures can be applied to the API request prior to sending the API request to the system. For example, applying a runtime policy to an API request may determine the manner in which the API request is serviced by the system or cause data associated with the API request to be collected.

At 410, the API request is send to a system. The API request is sent to the system. In some embodiments, the external address included in the API request is translated into an internal address associated with the system and then the API request is passed to the system for the system to process the API request.

At 412, a response to the API request is sent to the client. The response to the API request is received from the system. In various embodiments, the response to the API request includes a result associated with the operation that is included in the API request and/or a status code. In various embodiments, the status code included in the response to the API request comprises a HTTP status code. Regardless of whether the status code included in response to the API request indicates that the API request is invalid or valid, the response is sent back to the client. For example, at least a portion of the response to the API request can be presented at the client.

Figure 5:
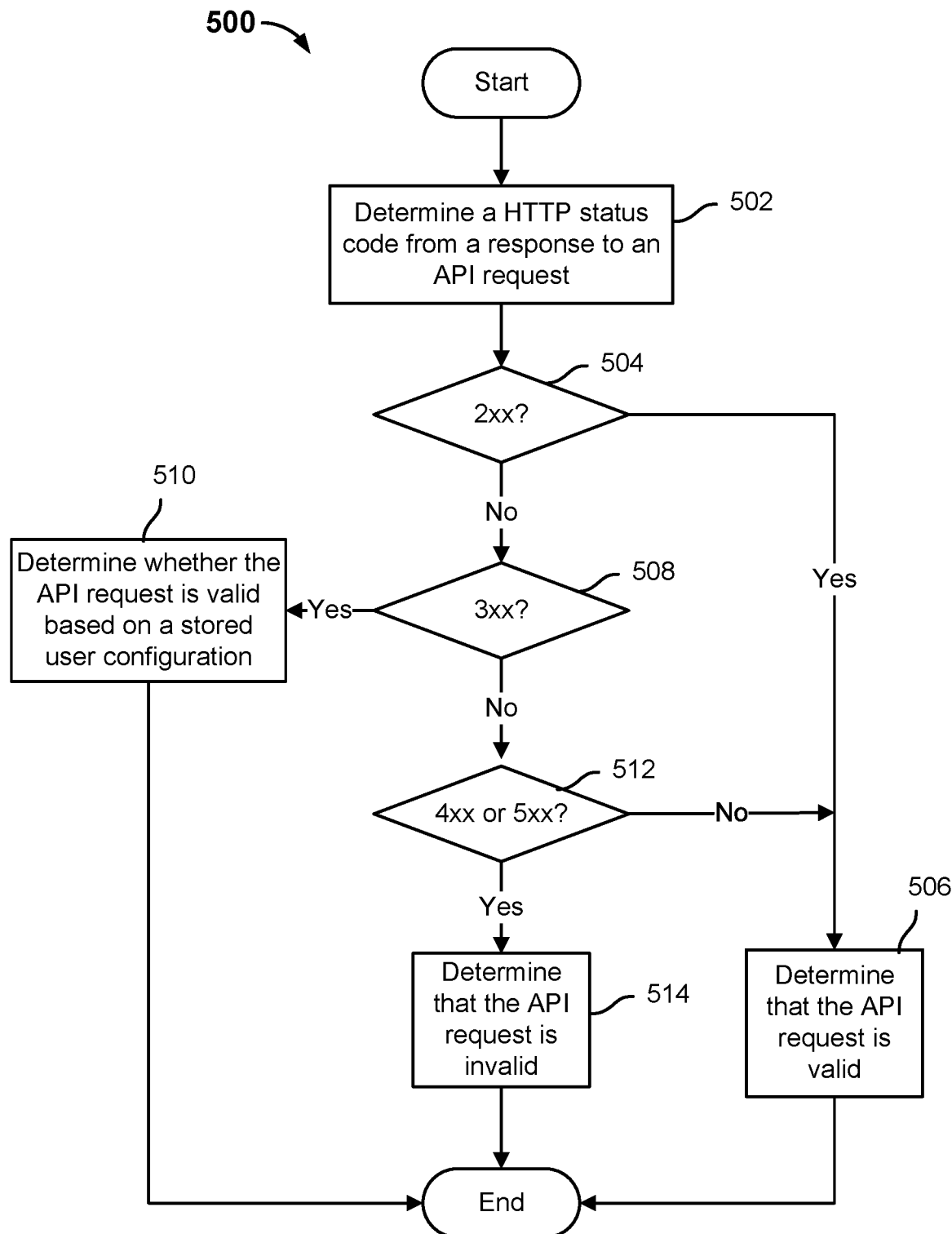
FIG. 5 is a flow diagram showing an example of a process for determining whether an API request is valid based on a response to the API request that is received from the system.

At 414, it is determined whether the API request is valid based on the response to the API request. The status code of the response indicates whether the API request was valid, invalid, or is associated with a redirection. Whether an API request whose response status code indicates that the API request is associated with a redirection is considered to be a valid or invalid depends on a stored user configuration. FIG. 5, below, describes an example process of determining whether the API request is valid based on a response to the API request that is received from the system. In the event that the API request is valid based on a response to the API request that is received from the system, control is transferred to 416. Otherwise, in the event that the API request is invalid based on a response to the API request that is received from the system, control is transferred to 415.

At 415, whether the candidate request signature is to be stored is determined based on a stored user configuration. In some embodiments, a user configuration may be defined by an administrative user that indicates whether a candidate request signature obtained from an API request whose corresponding response includes a status code that indicates that the API request is invalid should be stored and added to the API model. For example, the user configuration may indicate that an API request whose response indicated that the API request was invalid should not be stored or used to update the API model because by ignoring candidate request signatures associated with invalid API requests, the API model associated with the system is prevented from being populated with API signatures that are not recognized/serviceable by the system. As such, the status code of responses to API requests could be used as a type of feedback that is used to filter out the candidate signatures that are not desirable to store. In another example, the user configuration may indicate that an API request whose response indicated that the API request was invalid should still be stored or used to update the API model because it is informative to document all request signatures that are used by clients, even those that are invalid. In the event that the stored user configuration indicates to store the candidate request signature of an invalid API request, control is transferred to 416. Otherwise, in the event that the stored user configuration indicates to not store the candidate request signature of an invalid API request, control is transferred to 430.

At 416, the candidate request signature is stored. A candidate request signature that is obtained from the API request is stored. Optionally, a runtime policy that is applicable to responses of API requests with candidate request signatures can be applied to the response to the API request.

At 418, a response signature is determined and collected from the response to the API request. In various embodiments, a candidate signature to a response to an API request is determined and also stored. In some embodiments, the determined response signature is also compared against the classification map associated with the system and is only stored if the determined response signature does not match an existing response signature that is already included in the classification map or comprises a modification to an existing response signature that is already included in the classification map.

In some embodiments, the collected candidate request signature and/or response signature are provided to an administrative user. The collected candidate request and/or candidate response signatures are periodically analyzed and sorted into groups of similar signatures using a pattern analysis technique. In some embodiments, the groups of similar signatures can be presented to an administrative user (e.g., associated with the backend system) at a user interface (e.g., a model management interface). The administrative user may submit inputs via the user interface that can be used to update the pattern analysis. For example, the user inputs can be used to determine whether an existing group of signatures should be divided into different groups of signatures and/or if two existing groups of signatures should be combined into a single group of signatures. In various embodiments, a user input may also be received from the administrative user via the model management interface to include one or more selected API signatures into the API model of the system.

At 420, an API model is updated based at least in part on collected candidate signatures. If an API model already exists for the system, then the existing API model is updated with the collected candidate API signatures (e.g., that are selected by the administrative user). Otherwise, if an API model did not already exist for the system, then the candidate API signatures (e.g., that are selected by the administrative user) can be used to build a new API model for the system. In some embodiments, the API model is updated or created with the collected candidate signatures based on a user input at the model management interface. In some embodiments, the API model is updated or created with the collected candidate signatures without presenting the collected candidate signatures at the model management interface and also without any user intervention.

At 422, a classification map is optionally updated based on the updated API model. As described above, a classification map comprises a run-time optimized search tree that is derived from an API model. In the event that the API model is updated, in some embodiments, the corresponding classification map is subsequently updated using the updated API model so that the candidate signatures added to the API model will also be present in the classification map and can therefore be compared against signatures determined from subsequent API requests and/or responses.

At 424, a runtime policy is applied to the API request. Optionally, a runtime policy that is applicable to API requests with existing request signatures can be applied to the API request prior to sending the API request to the system.

At 426, the API request is sent to the system.

At 428, the response to the API request is sent to the client. The response to the API request is received from the system and then sent to the client. Optionally, a runtime policy that is applicable to responses of API requests with existing signatures can be applied to the response to the API request prior to sending the response back to the client.

At 430, analytics are determined from the API request and/or the response to the API request. Optionally, analytics can be determined from either or both the API request and the response to the API request, regardless of whether the API request is determined to be valid or invalid based on the status code included in the response to the API request.

FIG. 5 is a flow diagram showing an example of a process for determining whether an API request is valid based on a response to the API request that is received from the system. In some embodiments, process 500 is implemented at an API proxy server such as API proxy server 108 of system 100 of FIG. 1. In some embodiments, step 414 of process 400 of FIG. 4 is implemented, at least in part, using process 500.

Process 500 describes an example process of determining whether an API request is valid based on a response to the API request that is received from the system and where the response includes a HTTP status code.

At 502, a HTTP status code is determined from a response to an API request. For example, the API request was forwarded to the associated system. After processing the API request, the system returned a response to the API request that includes a result associated with the operation associated with the API request and/or a HTTP status code. The HTTP status code comprises a value that is used to determine whether the API request is valid or invalid. As described above, a candidate request signature that is extracted from the API request may or may not be stored to potentially add to an API model associated with the system depending on whether the API request is determined to valid or invalid.

At 504, it is determined whether the status code comprises a 2xx status code. A "2xx status code" is a status code that is in the 200 to 299 range. A 2xx status code indicates that the API request is valid. In the event that the status code comprises a 2xx status code, control is transferred to 506. Otherwise, in the event that the status code does not comprise a 2xx status code, control is transferred to 508.

At 506, the API request is determined to be valid. A candidate request signature that is extracted from an API request whose response from the system indicates that the API request is valid is potentially added to the API model associated with the system.

At 508, it is determined whether the status code comprises a 3xx status code. A "3xx status code" is a status code that is in the 300 to 399 range. A 3xx status code indicates that the API request is associated with a redirection. In the event that the status code comprises a 3xx status code, control is transferred to 510. Otherwise, in the event that the status code does not comprise a 3xx status code, control is transferred to 512.

At 510, whether the API request is valid is determined based on a stored user configuration. If the stored user configuration determines that an API request associated with a response status code of 3xx is valid, then a candidate request signature that is extracted from the API request is potentially added to the API model associated with the system. Otherwise, if the stored user configuration determines that an API request associated with a response status code of 3xx is invalid, then a candidate request signature that is extracted from the API request may not be added to the API model associated with the system.

At 512, it is determined whether the status code comprises a 4xx status code or a 5xx status code. A "4xx status code" is a status code that is in the 400 to 499 range. A "5xx status code" is a status code that is in the 500 to 599 range. Either a 4xx or a 5xx status code indicates that the API request is invalid. In the event that the status code comprises a 4xx or a 5xx status code, control is transferred to 514. Otherwise, in the event that the status code does not comprise either a 4xx or a 5xx status code, control is transferred to 506.

At 514, the API request is determined to be invalid. A candidate request signature that is extracted from an API request whose response from the system indicates that the API request is invalid may not be added to the API model associated with the system. As described in the example of process 400 of FIG. 4, whether the candidate request signature associated with an invalid API request is added to the API model depends on another stored user configuration.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method comprising:
    receiving a transaction that is an application programming interface (API) request sent over a network, where the API request includes an indication of an operation type of an operation to be performed and an indication of a path of the operation;
    sending the API request to a backend system;
    receiving a response to the API request from the backend system;
    determining, by a server and from the transaction, a signature that represents a combination of the operation type of the operation to be performed indicated by the API request and the path of the operation indicated by the API request;
    in response to a determination that a combination of the operation type of the operation to be performed and the path of the operation is not found in an API model, determining whether a status code that is included in the response to the API request indicates that the backend system determined that the API request was valid; and
    in response to a determination that the status code that is included in the response to the API request indicates that the backend system determined that the API request was valid, adding the signature that represents the operation type of the operation and the path of the operation indicated by the API request to the API model.

2. The method of claim 1, comprising:
    receiving a second transaction that is a second API request sent over the network;
    determining, by the server and from the second transaction, that a second signature determined from the second transaction matches the signature added to the API model; and
    in response to determining, by the server and from the second transaction, that the second signature determined from the second transaction matches the signature added to the API model, applying a run-time policy to the second transaction that is not applied to the transaction that was previously received.

3. The method of claim 1, wherein the determined signature comprises a set of attributes that identifies the transaction.

4. The method of claim 3, wherein the set of attributes includes one or more of the following: a resource path pattern, an operation, a header, and a body element.

5. The method of claim 1, wherein in response to a determination that a combination of the operation type of the operation to be performed and the path of the operation is not found in an API model, determining whether a status code that is included in the response to the API request indicates that the backend system determined that the API request was valid comprises:
    comparing the signature to a classification map, wherein the classification map is determined from the API model;
    determining that the signature is not found in the classification map; and
    determining that the signature comprises a candidate signature.

6. The method of claim 5, wherein adding the signature that represents the operation type of the operation and the path of the operation indicated by the API request to the API model comprises:
    presenting the candidate signature at a user interface; and
    receiving a user input to add the candidate signature to the API model.

7. The method of claim 1, wherein adding the signature that represents the operation type of the operation and the path of the operation indicated by the API request to the API model is performed without user intervention after the determination that the status code that is included in the response to the API request indicates that the backend system determined that the API request was valid.

8. A system comprising:
    one or more computers and one or more storage devices storing instructions that are operable, when executed by the one or more computers, to cause the one or more computers to perform operations comprising:
    receiving a transaction that is an application programming interface (API) request sent over a network, where the API request includes an indication of an operation type of an operation to be performed and an indication of a path of the operation;
    sending the API request to a backend system;
    receiving a response to the API request from the backend system;
    determining, by a server and from the transaction, a signature that represents a combination of the operation type of the operation to be performed indicated by the API request and the path of the operation indicated by the API request;
    in response to a determination that a combination of the operation type of the operation to be performed and the path of the operation is not found in an API model, determining whether a status code that is included in the response to the API request indicates that the backend system determined that the API request was valid; and in response to a determination that the status code that is included in the response to the API request indicates that the backend system determined that the API request was valid, adding the signature that represents the operation type of the operation and the path of the operation indicated by the API request to the API model.

9. The system of claim 8, the operations comprising:

receiving a second transaction that is a second API request sent over the network;

determining, by the server and from the second transaction, that a second signature determined from the second transaction matches the signature added to the API model; and in response to determining, by the server and from the second transaction, that the second signature determined from the second transaction matches the signature added to the API model, applying a run-time policy to the second transaction that is not applied to the transaction that was previously received.

10. The system of claim 8, wherein a determined signature comprises a set of attributes that identifies the transaction.

11. The system of claim 10, wherein the set of attributes includes one or more of the following: a resource path pattern, an operation, a header, and a body element.

12. The system of claim 8, wherein in response to a determination that a combination of the operation type of the operation to be performed and the path of the operation is not found in an API model, determining whether a status code that is included in the response to the API request indicates that the backend system determined that the API request was valid comprises:

comparing the signature to a classification map, wherein the classification map is determined from the API model;

determining that the signature is not found in the classification map; and determining that the signature comprises a candidate signature.

13. The system of claim 12, wherein adding the signature that represents the operation type of the operation and the path of the operation indicated by the API request to the API model comprises:

presenting the candidate signature at a user interface; and
receiving a user input to add the candidate signature to the API model.

14. The system of claim 8, wherein adding the signature that represents the operation type of the operation and the path of the operation indicated by the API request to the API model is performed without user intervention after the determination that the status code that is included in the response to the API request indicates that the backend system determined that the API request was valid.

15. A non-transitory computer-readable medium storing software comprising instructions executable by one or more computers which, upon such execution, cause the one or more computers to perform operations comprising:

receiving a transaction that is an application programming interface (API) request sent over a network, where the API request includes an indication of an operation type of an operation to be performed and an indication of a path of the operation;

sending the API request to a backend system;

receiving a response to the API request from the backend system;

determining, by a server and from the transaction, a signature that represents a combination of the operation type of the operation to be performed indicated by the API request and the path of the operation indicated by the API request;

in response to a determination that a combination of the operation type of the operation to be performed and the path of the operation is not found in an API model, determining whether a status code that is included in the response to the API request indicates that the backend system determined that the API request was valid; and in response to a determination that the status code that is included in the response to the API request indicates that the backend system determined that the API request was valid, adding the signature that represents the operation type of the operation and the path of the operation indicated by the API request to the API model.

16. The medium of claim 15, the operations comprising:

receiving a second transaction that is a second API request sent over the network;

determining, by the server and from the second transaction, that a second signature determined from the second transaction matches the signature added to the API model; and in response to determining, by the server and from the second transaction, that the second signature determined from the second transaction matches the signature added to the API model, applying a run-time policy to the second transaction that is not applied to the transaction that was previously received.

17. The medium of claim 15, wherein the determined signature comprises a set of attributes that identifies the transaction.

18. The medium of claim 17, wherein the set of attributes includes one or more of the following: a resource path pattern, an operation, a header, and a body element.

19. The medium of claim 15, wherein in response to a determination that a combination of the operation type of the operation to be performed and the path of the operation is not found in an API model, determining whether a status code that is included in the response to the API request indicates that the backend system determined that the API request was valid comprises:

comparing the signature to a classification map, wherein the classification map is determined from the API model;

determining that the signature is not found in the classification map; and determining that the signature comprises a candidate signature.

20. The medium of claim 19, wherein adding the signature that represents the operation type of the operation and the path of the operation indicated by the API request to the API model comprises:

presenting the candidate signature at a user interface; and
receiving a user input to add the candidate signature to the API model.

* * * * *